United States Patent
Baur et al.

(10) Patent No.: US 7,196,454 B2
(45) Date of Patent: Mar. 27, 2007

(54) POSITIONING DEVICE FOR MICROSCOPIC MOTION

(75) Inventors: Christof Baur, Dallas, TX (US); Kenneth L. Bray, Garland, TX (US)

(73) Assignee: Zyvex Corporation, Richardson, TX (US)

( * ) Notice: Subject to any disclaimer, the term of this patent is extended or adjusted under 35 U.S.C. 154(b) by 42 days.

(21) Appl. No.: 11/061,076

(22) Filed: Feb. 18, 2005
(Under 37 CFR 1.47)

(65) Prior Publication Data

US 2005/0184623 A1 Aug. 25, 2005

Related U.S. Application Data

(60) Provisional application No. 60/546,352, filed on Feb. 20, 2004.

(51) Int. Cl.
*H01L 41/08* (2006.01)
*H01L 41/04* (2006.01)

(52) U.S. Cl. .......................... 310/323.01; 310/323.02; 310/323.03; 310/323.09; 310/323.17

(58) Field of Classification Search ................ 310/328, 310/323.01–323.03, 323.09, 323.017
See application file for complete search history.

(56) References Cited

U.S. PATENT DOCUMENTS

| | | |
|---|---|---|
| 3,134,942 A | 5/1964 | Rhodes |
| 3,535,515 A | 10/1970 | Jones et al. |
| 3,714,423 A | 1/1973 | Lucas |
| 4,019,073 A | 4/1977 | Vishnevsky et al. |
| 4,463,257 A | 7/1984 | Simpkins et al. |
| 4,587,431 A | 5/1986 | Uemura |
| 4,601,551 A | 7/1986 | Pettingell et al. |
| 4,672,256 A * | 6/1987 | Okuno et al. .......... 310/323.07 |
| 4,678,955 A | 7/1987 | Toda |
| 4,729,646 A | 3/1988 | Clark et al. |
| 4,736,129 A * | 4/1988 | Endo et al. ............. 310/323.11 |
| 4,798,989 A | 1/1989 | Miyazaki et al. |
| 4,874,979 A | 10/1989 | Rapp |
| 4,919,001 A | 4/1990 | Ogiwara et al. |
| 5,036,205 A | 7/1991 | Clement et al. |
| 5,055,680 A | 10/1991 | Kesmodel et al. |
| 5,068,535 A | 11/1991 | Rabalais |

(Continued)

FOREIGN PATENT DOCUMENTS

DE 19524907 A1 1/1997

(Continued)

OTHER PUBLICATIONS

"Electrical Characterization of Transistors in an SRAM Array for the 90nm Process Node", Multi Probe, Inc., Santa Barbara, California, Application Note: MPI 011603, 2002.

(Continued)

*Primary Examiner*—Darren Schuberg
*Assistant Examiner*—J. Aguirrechea
(74) *Attorney, Agent, or Firm*—Haynes and Boone, LLP

(57) ABSTRACT

An apparatus including a base configured to slidably engage a driven element, a piezoelectric element interposing the base and the driven element and attached to the base proximate a first piezoelectric element end, and a friction element attached proximate a second piezoelectric element end and configured to selectively engage the driven element.

20 Claims, 8 Drawing Sheets

U.S. PATENT DOCUMENTS

| | | | |
|---|---|---|---|
| 5,081,353 A | 1/1992 | Yamada et al. | |
| 5,089,740 A | 2/1992 | Ono | |
| 5,117,110 A | 5/1992 | Yasutake et al. | |
| 5,124,645 A | 6/1992 | Rhoden et al. | |
| 5,225,683 A | 7/1993 | Suzuki et al. | |
| 5,237,238 A | 8/1993 | Berghaus et al. | |
| 5,412,503 A | 5/1995 | Nederlof | |
| 5,455,420 A | 10/1995 | Ho et al. | |
| 5,493,236 A | 2/1996 | Ishii et al. | |
| 5,510,615 A | 4/1996 | Ho et al. | |
| 5,568,004 A | 10/1996 | Kleindiek | |
| 5,589,723 A | 12/1996 | Yoshida et al. | |
| 5,635,836 A | 6/1997 | Kirtley et al. | |
| 5,756,997 A | 5/1998 | Kley | |
| 5,922,179 A | 7/1999 | Mitro et al. | |
| 5,939,816 A | 8/1999 | Culp | |
| 5,989,779 A | 11/1999 | Hatakeyama et al. | |
| 5,994,820 A | 11/1999 | Kleindiek | |
| 6,000,280 A | 12/1999 | Miller et al. | |
| 6,002,136 A | 12/1999 | Naeem | |
| 6,111,336 A | 8/2000 | Yoshida et al. | |
| 6,127,681 A | 10/2000 | Sato et al. | |
| 6,127,682 A | 10/2000 | Nakamoto | |
| 6,188,161 B1 * | 2/2001 | Yoshida et al. | 310/328 |
| 6,198,299 B1 | 3/2001 | Hollman | |
| 6,210,988 B1 | 4/2001 | Howe et al. | |
| 6,268,958 B1 | 7/2001 | Furuhashi | |
| 6,279,389 B1 | 8/2001 | Adderton et al. | |
| 6,346,710 B1 | 2/2002 | Ue | |
| 6,403,968 B1 | 6/2002 | Hazaki et al. | |
| 6,420,722 B2 | 7/2002 | Moore et al. | |
| 6,422,077 B1 | 7/2002 | Krauss et al. | |
| 6,448,622 B1 | 9/2002 | Franke et al. | |
| 6,452,307 B1 | 9/2002 | Olin et al. | |
| 6,501,289 B1 | 12/2002 | Takekoshi | |
| 6,538,254 B1 | 3/2003 | Tomimatsu et al. | |
| 6,539,519 B1 | 3/2003 | Meeker | |
| 6,583,413 B1 | 6/2003 | Shinada et al. | |
| 6,603,239 B1 | 8/2003 | Michely et al. | |
| 6,627,889 B2 | 9/2003 | Ochiai et al. | |
| 6,690,101 B2 | 2/2004 | Magnussen et al. | |
| 6,865,509 B1 | 3/2005 | Hsiung et al. | |
| 6,891,170 B1 | 5/2005 | Yu et al. | |
| 6,927,400 B2 | 8/2005 | Rasmussen | |
| 2001/0044156 A1 | 11/2001 | Kelly et al. | |
| 2002/0027563 A1 | 3/2002 | Van Doan et al. | |
| 2002/0064341 A1 | 5/2002 | Fauver et al. | |
| 2002/0121614 A1 | 9/2002 | Moore | |
| 2002/0125427 A1 | 9/2002 | Chand et al. | |
| 2002/0138353 A1 | 9/2002 | Schreiber et al. | |
| 2002/0166976 A1 | 11/2002 | Sugaya et al. | |
| 2003/0042921 A1 | 3/2003 | Hollman | |
| 2003/0089852 A1 | 5/2003 | Ochiai et al. | |
| 2003/0089860 A1 | 5/2003 | Asjes | |
| 2003/0137539 A1 | 7/2003 | Dees | |
| 2003/0187867 A1 | 10/2003 | Smartt | |
| 2003/0212725 A1 | 11/2003 | Ovshinsky et al. | |
| 2004/0245466 A1 | 12/2004 | Robinson et al. | |
| 2005/0029467 A1 | 2/2005 | Yu et al. | |
| 2005/0184028 A1 | 8/2005 | Baur et al. | |
| 2005/0184236 A1 | 8/2005 | Baur et al. | |

FOREIGN PATENT DOCUMENTS

| | | |
|---|---|---|
| EP | 0927880 | 7/1999 |
| JP | 2072535 | 3/1990 |
| JP | 5018706 | 1/1993 |
| JP | 11135015 A | 5/1999 |
| JP | 2001198896 A | 7/2001 |
| JP | 2002033366 A | 1/2002 |
| WO | WO96/13724 | 5/1996 |
| WO | WO 96/20495 | 7/1996 |
| WO | WO 00/10191 | 8/1999 |
| WO | WO01/09965 | 2/2001 |
| WO | WO02/16089 | 2/2002 |

OTHER PUBLICATIONS

"IDS 10000cs", Schlumberger Semiconductor Solutions, San Jose, California, Aug. 2001.

"Investment Approaches: Lux NanoSphere: Measurement", Nanotechnology, The Nanotech Report 2001, pp. 122-136.

"KZ100 Nanomanipulator System", Zyvex Corporation, Richardson, Texas, Document: KZ00-ZZDS-001c, 2004.

"NanoEffector Tools", Zyvex Corporation, http://www.zyvex.com/Products/Grippers_Features.html/

"Processing Material in Electron Microscopes: Nanomanipulation With Several D.O.F." http://www.nanomotor.de/aa_processing.htm.

"SEM-Manipulators," http://www.nanomotor.de/pdf/Compare_e_lo.PDF.

"SRAM Probing with Multiscan AFP", Multiprobe, Inc., Santa Barbara, California, Multiprobe Movie, 2004.

"Zyvex A100 Assembly System", Zyvex Corporation, Richardson, Texas, Document: A100-ZZDS-001c, 2004.

"Zyvex F100 Nanomanipulator System", Zyvex Corporation, Richardson, Texas, Document: F100-ZZDS-001c, 2004.

"Zyvex Mdriver 1000 MEMS Driving Station", Zyvex Corporation, Richardson, Texas, Document: ZMDR-ZZDS-001a, 2004.

"Zyvex NanoSharp Probes", Zyvex Corporation, Richardson, Texas, Document: ZPRB-ZZDS-001c, 2004.

"Zyvex Nanosolve Additives for Epoxies", Zyvex Corporation, Richardson, Texas, Document: EPOX-ZZDS-001a, 2004.

"Zyvex Nanosolve Additives for Polyurethane", Zyvex Corporation, Richardson, Texas, Document: ZNAP-ZZDA-001c, 2004.

"Zyvex Nanosolve Additives", Zyvex Corporation, Richardson, Texas, Document: ZZPN-ZZDS-001c, 2004.

"Zyvex S100 Nanomanipulator System", Zyvex Corporation, Richardson, Texas, Document: S100-ZZDS-001c, 2004.

Akazawa, "Bistable Si Growth Conditions on Ge(100) in Synchrotron-Radiation-Excited Atomic Later Epitaxy from $SiH_2 Cl_2$", J. Appl. Phys. 81 (7), Apr. 1, 1997, pp. 3320-3322.

Akazawa, "Characterization of self-limiting SiH2Cl2 chemisorption and photon-stimulated desorption as elementary steps for Si atomic-layer epitaxy", NTT LSI Lab., Kanagawa, Japan, Physical Review B: Condensed Matter (1996), 54(15), pp. 10917-10926.

Beck et al., "Ultrahigh Vacuum Instrument That Combines Variable-Temperature Scanning Tunneling Microscopy with Fourier Transform Infrared Reflection-Absorption Spectroscopy for Studies of Chemical Reactions at Surfaces," Rev. Sci. Instrum. 73(3), Mar. 2002, pp. 1267-1272.

Bergander et al., "A Testing Mechanism and Testing Procedure for Materials in Inertial Drives", IEEE MHS, pp. 213-218, Nagoya, Oct. 20-22, 2002.

Bergander et al., "Development of Miniature Manipulators for Applications in Biology and Nanotechnologies", proceeding of Workshop "Microbiotics for Biomanipulation", pp. 11-35, IEEE IROS 2003, Oct. 27-31, 2003, Las Vegas, USA.

Bergander et al., "Integrated Sensors for PZT Actuators Based on Thick-Film Resistors", IEEE, MHS, pp. 181-186, Nagoya, Oct. 20-22, 2002.

Bergander et al., "Micropositioners for Microscopy Applications based on the Stick-Slip Effect", MHS 2000, Nagoya, pp. 213-216, Oct. 22-25, 2000.

Bergander et al., "Monolithic Piezoelectric Push-pull Actuators for Inertial Drives", IEEE MHS, pp. 309-316, Nagoya, Oct. 19-22, 2003.

Bergander et al., "Performance Improvements for Stick-Slip Positioners", IEEE MHS, pp. 59-66, Nagoya, Oct. 19-22, 2003.

Bergander et al., "Micropositioners for Microscopy Applications and Microbiology Based on Piezoelectric Actuators", Journal of Micromechatronics, vol. 2, No. 1, pp. 65-76, 2003.

Bergander, "Control, Wear Testing & Integration of Stick-Slip Micropositioning", these No. 2843, EPFL, Lausanne, Switzerland, 2003.
Binnig et al., "Single-tube three-dimensional scanner for scanning tunneling microscopy", Rev. Sci. Instrum. 57(8), Aug. 1986, pp. 1688-1689.
Blackford et al., "A vertical/horizontal two-dimensional piezoelectric driven inertial slider micropositioner for cryogenic applications", Rev. Sci. Instrum. 63(4), Apr. 1992, pp. 2206-2209.
Bleuler et al., "Applications of microrobotics and microhandling" in RIKEN Review No. 36 (Jun. 2001): Focused on Science and Technology in Micro/Nano Scale, pp. 26-28.
Breguet et al., "New Designs For Long Range, High Resolution, Multi-Degrees-Of-Freedom Piezoelectric Actuators", ACTUATOR'98, Bremen, Germany, pp. 198-201, Jun. 17-19, 1998.
Breguet et al., "Stick and Slip Actuators: design, control, performances and applications", International Symposium on Micromechatronics and Human Science, Nagoya, Japan, pp. 89-95, Nov. 25-28, 1998.
Breguet, "Stick and Slip Micro-Robots", Institut de Systemes Robotiques (ISR), Jan. 14, 1999.
Co et al., "Iso-splatting: A Point-Based Alternative to Isosurface Visualization", Computer Graphics and Applications, 2003. Proceedings 11th Pacific Conference on Oct. 8-10, 2003, Piscataway, NJ, IEEE, Oct. 8, 2003, pp. 325-334.
Codourey et al., "High Precision Robots for Automated Handling of Micro Objects", Seminar on Handling and Assembly of Microparts, Vienna, Nov. 1994.
Colclough, "A fast high-voltage amplifier for driving piezoelectric positioners", Rev. Sci. Instrum. 71(11), Mar. 2000, pp. 4323-4324.
Danuser et al., "Manipulation of Microscopic Objects with Nanometer Precision: Potentials and Limitations in Nano-Robot Design".
Dr. Volker Klocke Nanotechnik, Technical Data from Klocke Nanotechnik Websites, Aachen, Germany, 1998, 127 pages and CD ROM with movie.
Driesen et al., "Energy Consumption of Piezoelectric Actuators for Inertial Drives", IEEE MHS, pp. 51-58, Nagoya, Oct. 19-22, 2003.
Eigler et al., "Positioning Single Atoms with a Scanning Tunneling Microscope", Nature, Vol. 344, Apr. 5, 1990, pp. 524-526.
Erickson, "Gate Fault Isolation and Parametric Characterization through the use of Atomic Force Probing", Multiprobe, Inc. Santa Barbara, California,.
European Search Report from EP05251070.8, dated Jun. 27, 2005.
Fatikow et al., "A Flexible Microbot-Based Microassembly Station", Emerging Technologies and Factory Automation, 1999. Proceeding ETFA '99. 1999 7th IEEE International Conference, Barcelona, Spain Oct. 18-21, 1999, Piscataway, NJ USA, pp. 397-406.
Frohn et al., "Coarse Tip Distance Adjustment and Positioner for a Scanning Tunneling Microscope", Rev. Sci. Instrum. 60 (6), Jun. 1989, pp. 1200-1201.
FuturePundit, "Nanopore Technology: Sequence your DNA in Two hours!", Sep. 4, 2002, http://www.futurepundit.com/archives/000017.html.
Gupta, "Attaching a Nanotube to a Zyvex S100 Nanomanipulator End Effector", Zyvex Corporation, Richardson, Texas, Document: S1EE-ZZAN-001a, 2004.
Gupta, et al., "Measuring Electrical Breakdown of a Dielectric-Filled Trench Used for Electrical Isolation of Semiconductor Devices", Zyvex Corporation, Richardson, Texas, Document: MEBD-ZZAN-001a, 2004.
Hartman, "Mechanical Measurement of Individual Carbon Nanotubes Using MEMS and the S100 Nanomanipulator", Zyvex Corporation, Richardson, Texas, Document: MMIC-ZZAN-001b, 2004.
Hasunuma et al., "Gas-Phase-Reaction-Controlled Atomic-Layer Epitaxy of Silicon", J. Vac. Sci. Technol. A16 (1998) 679.
Hersam et al., "Silicon-Based Molecular Nanotechnology", Nanotechnology 11, (2000), pp. 70-76.
Hinze, "Memo Functions, Polytypically!", Institut fur Informatik III, University Bonn, Bonn Germany, Jul. 2000.

Hochberg et al., "Four Point Probe I-V Electrical Measurements Using the Zyvex Test System Employing a Keithley 4200", Zyvex Corporation, Richardson, Texas, Document: KZ00-ZZAN-001a, 2004.
IBM Research Press Solutions, "IBM Scientists Build World's Smallest Operating Computing Circuits", San Jose, CA, Oct. 24, 2002.
Imai et al., "Atomic layer epitaxy of silicon by gas confinement method", Department Physical Electronics, Tokyo Institute Technology, Tokyo, Japan, Transactions of the Materials Research Society of Japan (1994), 19A (Superconductors, Surfaces and Superlattices), pp. 145-148.
International Preliminary Examination Report PCT/US03/16695, dated Sep. 3, 2004.
International Preliminary Examination Report PCT/US03/16750, dated Sep. 3, 2004.
International Search Report and Written Opinion from PCT Application No. PCT/US2004/035625, Mar. 2005.
International Search Report and Written Opinion from PCT/US2004/043833, May 25, 2005.
International Search Report PCT/US03/16695, dated Sep. 25, 2003.
International Search Report PCT/US03/16750, dated Sep. 25, 2003.
International Search Report/Written Opinion PCT/US2004/031482, dated Mar. 18, 2005.
Ishida et al., "Growth temperature window and self-limiting process in sub-atomic-layer Epitaxy", Faculty Technology, Tokyo University Agriculture and Technology, Koganeri, Japan. Japanese Journal of Applied Physics, Part 1: (1996), 35(7), pp. 4011-4015.
Klocke Nanotechnik, "Manipulators: Universal Tools with 1 Nanometer Resolution," http://www.nanomotor.de/p_nanomanipulator.htm.
Langen et al., "Stick-slip actuators for micromachining of glass", International Conference on Micromechatronics for Information and Precision Equipment, Tokyo, Japan, pp. 261-264, Jul. 20-23, 1997.
Lyding et al., "Variable-temperature scanning tunneling microscope", Rev. Sci. Instrum. 59 (9), Sep. 1998, pp. 1897-1902.
Matsuyama et al., "Hetero atomic-layer epitaxy of Ge on Si(100)", Japanese Journal of Applied Physics, Part 1, vol. 39, No. 5A, May 2000, pp. 2536-2540.
Meller et al., "Voltage-Driven DNA Translocations through a Nanopore", Physical Review Letters, vol. 86, No. 15, Apr. 9, 2001, pp. 3435-3438.
Moller et al., "Tunneling Tips Imaged by Scanning Tunneling Microscopy", J. Vac. Sci. Technol. A 8 (1), Jan./Feb. 1990, pp. 434-437.
Mugele et al., "New Design of a variable-temperature ultrahigh vacuum scanning tunneling microscope", Rev. Sci. Instrum. 69(4), Apr. 1998, pp. 1765-1769.
Ott et al., "Al2O3 thin film growth on Si (100) using binary reaction sequence chemistry", Thin Solid Films 292 (1997) 135-144.
Parker et al., "Exploiting Self-Similarity in Geometry for Voxel Based Solid Modeling", Proc Symp Solid Model Appl; Proceedings of the Symposium on Solid Modeling and Applications 2003, Jun. 2003, pp. 157-166.
Pérez et al, "Modelling, characterisation and implementation of a monolithic piezo actuator (MPA) of 2 and 3 degrees of freedom (DOF)", Actuator 2002, Bremen, Germany, Jun. 10-12, 2002.
Pérez et al., "Monolithic piezo-actuators: modeling, validation in the laboratory and optimisation of working conditions", ACTUATOR 2000, pp. 49-52, Bremen, Germany, Jun. 19-21, 2000.
Physik Instrumente, Theory and Applications of Piezo Actuators and PZT NanoPositioning Systems, www.physikinstrumente.com/tutorial, 2001.
Pi, "Basic Introduction to Nano-Positioning with Piezoelectric Technology", http/www.pi/ws, pp. 4/9-4/14.
Piezo Brochure, "Ultrasonic Transducers & Crystals".
Pohl, "Dynamic Piezoelectric Translation Devices", Rev. Sci. Instrum., 58(1), Jan. 1987, pp. 54-57.
Popinet, "Gerris: a Tree-Based Adaptive Solver for the Incompressible Euler Equations in Complex Geometries", Journal of Computational Physics Academic Press USA, vol. 190, No. 2, Sep. 2003.

Renner et al., "A vertical piezoelectric inertial slider", Rev. Sci. Instrum. 61 (3), Mar. 1990, pp. 965-967.

Ritala et al., "Atomic Layer Epitaxy—a valuable tool for nanotechnology?", Nanotechnology V10 1999 pp. 19-24.

Rusinkiewicz et al., "Qspalt: A Multiresolution Point Rendering System for Large Meshes", Computer Graphics Proceedings, Annual Conference Series, 2000, pp. 343-352.

Satoh et al., "Atomic-layer epitaxy of silicon on (100) surface", Japanese Journal of Applied Physics, Part 1: Regular Papers and Short Notes and Review Papers v 39 n 10 Oct. 2000, pp. 5732-5736.

Shim et al., "Piezo-driven Metrological Multiaxis Nanopositioner", Rev. Sci. Instrum., 72(1); Nov. 2001, pp. 4183-4187.

Sugahara et al., "Modeling of silicon atomic-layer-epitaxy", Department of Physical Electronics, Tokyo Institute of Technology, Applied Surface Science (1996), 107 (Proceedings of the Third International Symposium on Atomically Controlled Surfaces and Interfaces, 1995), pp. 161-171.

Tu et al., "The Etree Library: A System for Manipulating Large Octrees on Disk", School of Computer Science, Pittsburgh, PA Jul. 2003.

Tuck, et al., "Powering MEMS Devices Using the S100 Nanomanipulator System", Zyvex Corporation, Richardson, Texas, Document: S1PM-ZZAN-001a, 2004.

Udeshi et al., "Memulator: A Fast and Accurate Geometric Modeling, Visualization and Mesh Generation for 3D MEMS Design and Simulation," Nanotech 2003, vol. 2, Technical Proceedings of the 2003 Nanotechnology Conference and TradeShow.

Udeshi, "Tetrahedral Mesh Generation from Segmented Voxel Data", 12th International Meshing Roundtable, Sep. 14-17, 2003.

Wildoer et al., "Scanning Tunneling Microscope Tip as a Positionable Contact: Probing a Josephson-Junction Array at Subkelvin Temperatures", J. Vac. Sci. Technol. B 16(5), Sep./Oct. 1998, pp. 2837-2840.

Yakimov, "Vertical Ramp-Actuated Inertial Micropositioner with a Rolling-Balls Guide", Rev. Sci. Instrum. 68 (1), Jan. 1997, pp. 136-139.

Yu et al., "Three-Dimensional Manipulation of Carbon Nanotubes Under a Scanning Electron Microscope", Nanotechnology 10 (1999), pp. 244-252.

Zesch et al., "Inertial Drives for Micro-and Nanorobots: Two Novel Mechanims" Swiss Federal Institute of Technology.

Zesch, "Multi-Degree-of-Freedom Micropositioning Using Stepping Principles," Dissertation submitted to the Swiss Federal Institute of Technology, Zurich, 1997.

\* cited by examiner

POSITIONING DEVICE FOR MICROSCOPIC MOTION

CROSS-REFERENCE TO RELATED APPLICATIONS

This application claims the benefit of U.S. Provisional Application No. 60/546,352, filed Feb. 20, 2004, entitled "POSITIONING DEVICE FOR MICROSCOPIC MOTION," which is hereby incorporated herein in its entirety.

BACKGROUND

Positioning devices may be employed in applications of varying scale, such as in microscopy (e.g., scanning probe microscopy), micro-assembly, and nano-assembly. Positioning devices may also be employed in applications of varying function, such as for probing, characterization, imaging and testing, as well as for manipulation and assembly.

Such positioning devices may be employed where it is necessary for a subject piece being examined or assembled to be coarsely positioned on a larger scale, such as to move the subject generally into place, and then finely positioned on a smaller scale to complete examination or assembly. Moreover, fine positioning can be critical to manipulation and examination of small-scale assemblers, probes, and scanning microscopes. For example, on very small scales, vibrations that may be caused by traditional coarse positioning devices can become intolerable. Nonetheless, it is often desirable or necessary for coarse positioning and fine positioning to be available on the same device.

The terms "micro-electronic device" and "micro-assembly" are employed generically herein to encompass micro-electronic components, micro-mechanical components, micro-electro-mechanical components, MEMs components and assemblies thereof. Generally, micro-electronic devices have feature dimensions that are less than about 1000 microns. The present disclosure also relates to nano-electronic devices, including nano-electro-mechanical devices (NEMs), which may have feature dimensions that are less than about 10 microns. Macro-scale electronic devices may also be used to generate movements on a microscopic scale and are also within the scope of the present disclosure. Macro-scale devices generally have feature dimensions that are larger than about 1000 microns, although 1000 microns is not an absolute demarcation between micro-scale and macro-scale devices.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
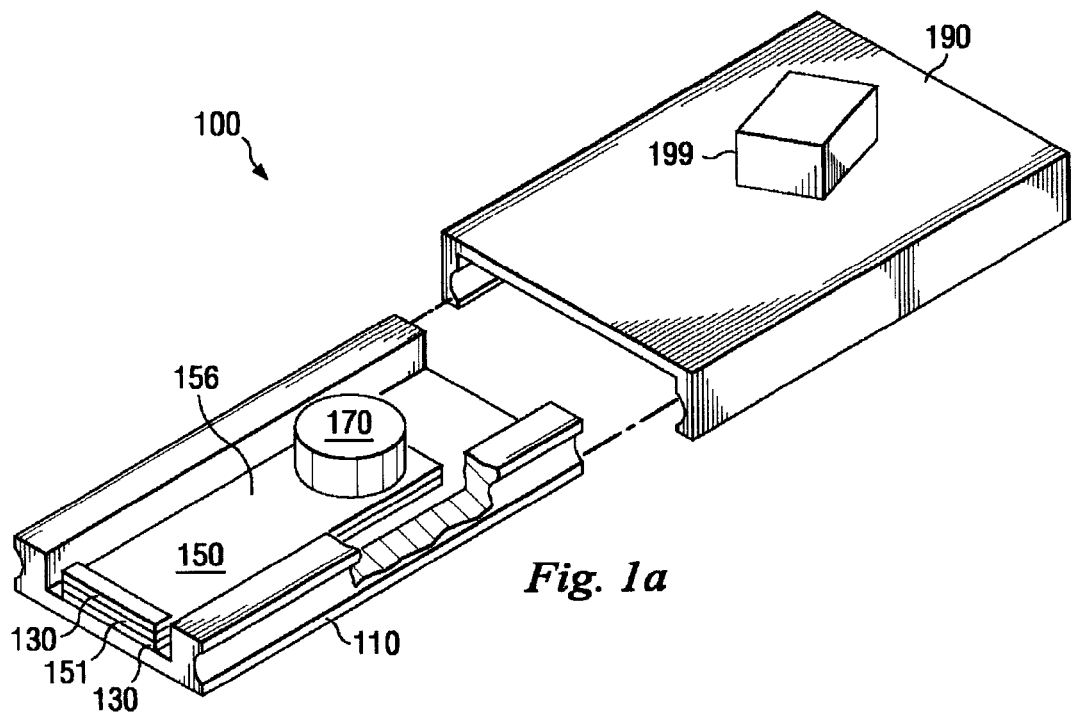
FIG. 1a is a perspective view of at least a portion of one embodiment of an apparatus according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not, in itself, dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1a, illustrated is a perspective view of at least a portion of one embodiment of an apparatus 100 according to aspects of the present disclosure. The apparatus 100 may be, include, or comprise a portion of an electromechanical device, a micro-electro-mechanical device (e.g., a MEMS device), a microelectronic device or other device within the scope of the present disclosure.

The apparatus 100 includes a base 110, which may comprise plastic, metal, silicon, and/or other materials. The base 110 may be manufactured by casting, molding, machining, ion beam milling, and/or other methods. The thickness of the base 110 may range from about 0.1 millimeters to about 1 millimeter, the length of the base 110 may range from about 5 millimeters to about 20 millimeters, and the width may range from about 2.5 millimeters to about 5 millimeters. In other embodiments, thickness of the base 110 may range between about 0.1 microns and about 5 microns, the length may range between about 50 microns and about 200 microns, and the width may range between about 25 microns and about 50 microns. Other ranges are possible that may be outside of those given. The present disclosure is not meant to be limited by ranges given herein.

An insulator 130 may be employed to attach an end 151 of a piezoelectric element 150 to the base 110. The insulator 130 may comprise glass, silicon oxide, and/or other dielectric materials. The insulator 130 may be formed by cutting, grinding, casting, machining, electro-discharge machining (EDM), and/or other methods, possibly to a thickness ranging from about 0.1 millimeter to about 1 millimeter. In other embodiments, the insulator 130 may be manufactured or otherwise formed on or over the base 110 by chemical vapor deposition (CVD), physical vapor deposition (PVD), plasma enhanced CVD (PECVD), atomic layer deposition (ALD), and/or other processes, possibly to a thickness ranging between about 0.1 microns and about 5 microns.

In some embodiments, the insulator 130 may be optional. For example, a portion or layer of the base 110 may comprise a dielectric material, such that the end 151 of the piezoelectric element 150 may be attached directly to the base 110. The piezoelectric element 150 and the base 110 may also be electrically and/or physically separated by features other than the insulator 130.

The piezoelectric element 150 may be generally reed-shaped. For example, the piezoelectric element 150 may have a substantially rectilinear shape having a width substantially greater than a thickness and a length substantially greater than the width, such that a cross-section substantially orthogonal to any axis of the piezoelectric element 150 may be substantially rectangular. However, other configurations are possible. For example, the piezoelectric element 150 may also have a circular cross-section, or perhaps a rounded but non-circular cross-section such as that which would reduce rotation of the piezoelectric element 150 relative to the base 110 or other proximate component. The cross-section of the piezoelectric element 150 may also vary in size and/or shape along its length.

The piezoelectric element 150 may comprise piezoelectric materials such as, for example, lead zirconate titanate (PZT), lead titanate (PbTiO$_3$), lead metaniobate (PbNb$_2$O$_6$), polyvinylidene-fluoride (PVDF), zinc oxide (ZnO), polyvinylidene-fluoride-triflourethylene (PVDF-TrFE), and/or other materials. The piezoelectric element 150 may be formed by sintering, grinding, and/or other processes. The piezoelectric element 150 may also be polarized. For example, the piezoelectric element 150 may be polarized by being heated (e.g., to above the curie point) and having an electric and/or magnetic field applied, and/or by other methods.

The piezoelectric element 150 may have thickness ranging between about 0.1 millimeters and about 1 millimeter. The length may range between about 0.5 centimeters and about 15 centimeters and the width may range between about 2.5 millimeters and about 5 centimeters. In other embodiments, the piezoelectric element 150 may have a thickness ranging from about 0.1 microns to about 5 microns, a width ranging from about 25 microns to about 50 microns, and a length ranging from about 50 microns to about 200 microns.

The piezoelectric element 150 may respond to an electrical signal by elongating and/or constricting. A periodic or otherwise fluctuating electrical signal or wave may be applied to the piezoelectric element 150 to achieve coarse positioning with the apparatus 100, while a non-fluctuating electrical signal may be employed to achieve fine positioning using the same piezoelectric element. In some embodiments, the piezoelectric element 150 may respond to either electrical signal by bending, in addition to or in the alternative to elongation and/or constriction.

A friction element 170 may be coupled to an end 156 of the piezoelectric element 150 distal from the insulator 130, such as to take full advantage of the motion of the piezoelectric element 150. The friction element 170 may comprise aluminum-bronze, phosphor-bronze, copper-beryllium, copper alloys, sapphire, and/or other materials, and may be formed by electro-chemical machining (ECM), electrical discharge machining (EDM), milling, and/or other methods. In one embodiment, the friction element 170 may be a boss extending from the piezoelectric element 150 wherein such an extension may be integrated with, or coupled to, the piezoelectric element 150.

In one embodiment, the thickness of the friction element 170 may range between about 0.1 millimeters and about 1 millimeter, and the diameter may range between about 0.8 millimeters and about 5 millimeters. The diameter may range between about 8 microns and about 50 microns. In other embodiments, the thickness of the friction element 170 may range between about 0.1 microns and about 5 microns.

Figure 1B:
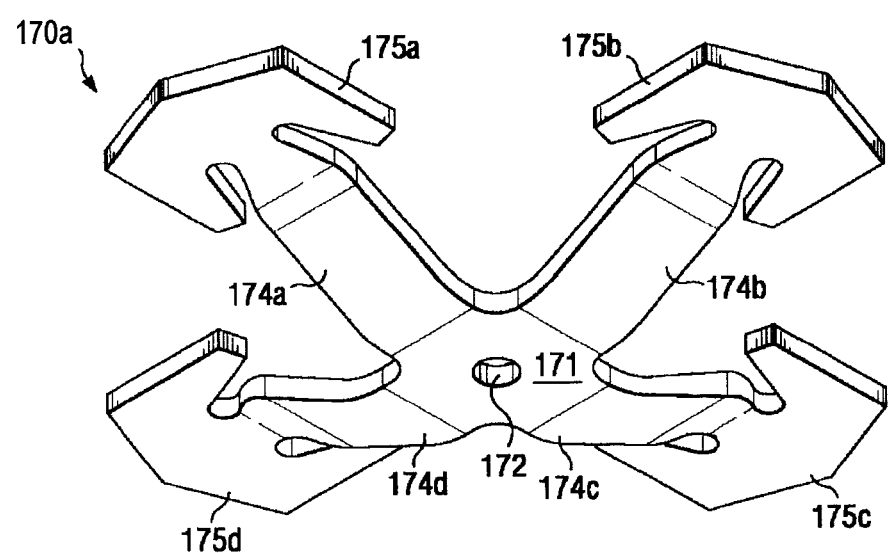
FIG. 1b is a perspective view of at least a portion of one embodiment of an apparatus according to aspects of the present disclosure.

The shape of the friction element 170 may be substantially cylindrical. In other embodiments, the friction element 170 may have other shapes or configurations, such as polyhedral shapes. The friction element 170 may also have a substantially square or rectangular footprint relative to the piezoelectric element 150. The friction element 170 may also comprise multiple friction members arranged in various configurations on the piezoelectric element 150. For example, FIG. 1b illustrates a perspective view of another embodiment of the friction element 170, designated by reference number 170a, according to aspects of the present disclosure. The friction element 170a includes a central section 171 which may have means (e.g., a fastener hole 172) for attachment to an piezoelectric element 150 (FIG. 1a). Supports 174a–d, which may be springs or otherwise resilient and/or flexible members or portions, support friction members 175a–d, respectively. The friction members 175a–d, and possibly a substantial portion of the entire friction element 170a, may be substantially similar to the friction element 170 (FIG. 1a) in composition, manufacture, and/or otherwise.

As shown in FIG. 1a, the friction element 170 selectively frictionally engages a driven element 190. The driven element 190 may be guided or restricted in one or more degrees of freedom (e.g., its planes of movement) by the base 110. For example, the base 110 may restrict predetermined degrees or directions of translation and/or rotation of the driven element 190 by employing a friction slide or a rolling element bearing slide configuration. Accordingly, motion of the driven element 190 may be limited to one degree of freedom, although other embodiments may allow more degrees of freedom. The driven element 190 may hold or convey an object or specimen 199 that is being moved by the apparatus 100. For example, the object 199 may be a micro-component or nano-device being assembled, or a specimen being scanned by a scanning electron microscope (SEM), other charged particle apparatus, or other types of microscopes. In some embodiments, the apparatus 100 includes attachment means for retaining the specimen 199 on the surface of the driven element 190. For example, the driven element 190 may include a recess or groove configured to receive the specimen 199, or a snap-type or friction connector may secure the test specimen 199 to the driven element 190.

The movement of the driven element 190 may be achieved by applying an electrical signal to the piezoelectric element 150, which may cause the piezoelectric element to elongate or contract. The friction element 170, or the piezoelectric element 150 itself, may transfer some, all, or a portion of, such movement to the driven element 190 based on the frequency, amplitude, and/or shape of the electrical signal. For example, to achieve coarse positioning with the apparatus 100, a voltage waveform may be applied to the piezoelectric element 150. Examples of voltage waveforms may include, but are not limited to, square waves, saw-tooth waves, cycloidal waves, parabolic waves, and/or superimpositions or combinations thereof.

For example, in embodiments in which a saw-tooth voltage waveform is applied, the piezoelectric element 150 may elongate or contract according to its bias or polarity. During the relatively shallow phase of the waveform, the piezoelectric element 150 (or the friction element 170) may "stick" to the driven element 190 for a substantial portion of the shallow phase such that most or all of the movement of the piezoelectric element is transferred to the driven element 190. However, during the relatively steep phase of the waveform, the elongation/contraction of the piezoelectric element 150 will be correspondingly faster and may cause the piezoelectric element 150 (or friction element 170) to overcome the static friction against the driven element 190 and "slip" during a substantial portion of the steep phase such that little or no movement of the piezoelectric element 190 may be transferred to the driven element 190. When the shallower phase of the waveform returns, the elongation/contraction of the piezoelectric element 150 may once again impart movement to the driven element 190. Thus the friction element 170 may selectively and frictionally engages the driven element 190 as a function of velocity, acceleration and/or friction coefficient of the friction element 170 relative to the driven element 190. This may be referred to as "slip-stick" or "stick-slip" motion.

The frequency of the waveform may vary and, in some embodiments, ranges between about 1 Hz and about 1 kHz. The amplitude of the waveform may also vary and, in some embodiments, ranges between about 2 V and about 500 V. Following the coarse positioning by slip-stick movement, a direct voltage may be applied to finely position the driven element 190 and, in turn, the object or specimen 199 positioned thereto. The direct voltage may range between about 10 mV and about 1 kV.

In other embodiments, the frequency, amplitude, and direct voltage may vary. For example, the wave form may be shaped to avoid or minimize exciting mechanical resonances of the piezoelectric element 150 or possibly the specimen 199. However, a waveform may be purposefully chosen which will operate the piezoelectric element 150 in resonance in order, for example, to free the driven element 190 from the friction element 170 if it were to become inadvertently coupled to the friction element 170 ("stuck"). In a case where the resonant frequency of the piezoelectric element 150 is not known, a wave form frequency sweep may be used.

Figure 2:
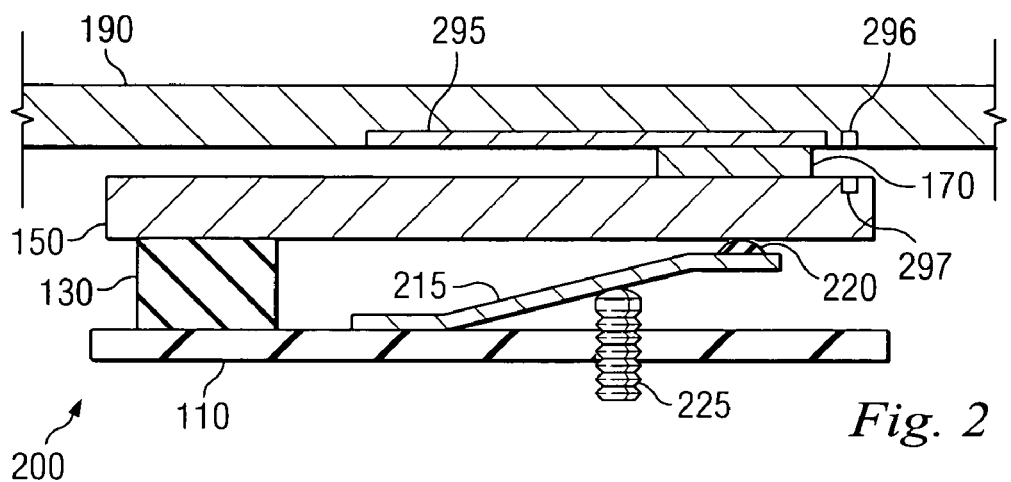
FIG. 2 is a sectional view of at least a portion of one embodiment of an apparatus according to aspects of the present disclosure.

Referring to FIG. 2 with continued reference to FIG. 1a, illustrated is a sectional view of another embodiment of the apparatus 100 according to aspects of the present disclosure, herein designated by the reference numeral 200. The embodiment of FIG. 2 comprises many of the above-described features of the embodiment shown in FIG. 1a. However, the apparatus 200 also comprises a biasing element 215, and may also include a spacer 220 coupled to the biasing element 215. As shown in the illustrated embodiment, the biasing element 215 may be a leaf spring or other type of spring configured to bias the piezoelectric element 150 (or an attached friction element 170) against the driven element 190. However, the biasing element 215 may also or alternatively be or include other mechanical, electrical, and/or magnetic biasing means within the scope of the present disclosure. The biasing force of the biasing element 215 may be adjustable, such as by a threaded fastener 225, an electrostatic or magnetic field, and/or by other means. However, in some embodiments, no adjustment may be employed or needed.

The apparatus 200 may also include a wear plate 295 coupled to the driven element 190 or otherwise interposing the driven element 190 and the friction element 170. The wear plate 295 may comprise silicon, sapphire, ceramic, aluminum ceramic or alloys thereof, and/or other materials and may be coupled with, or integral to, the driven element 190. In one embodiments the wear plate 295 may be formed by scribing, cleaving, polishing, and/or other processes, possibly to a thickness ranging between about 0.1 millimeter and about 1 millimeter. In other embodiments, the wear plate 295 may be formed by chemical vapor deposition (CVD), physical vapor deposition (PVD), plasma enhanced CVD (PECVD), atomic layer deposition (ALD), and/or other processes, possibly to a thickness ranging between about 0.1 microns and about 5 microns.

The force exerted by the friction element 170 against the wear plate 295 (e.g., the load force) may also be modulated or adjusted as a function of location of the friction element 170 on the piezoelectric element 150, the amount of time that the friction element is in a "slip" or "stick" phase, and/or the angle of the piezoelectric element 150 relative to the wear plate 295. Mechanical adjustment means of the force of the friction element 170 against the wear plate 295 may also be provided (e.g., screw 225). Adjustment of modulation of the force of the friction element 170 against the wear plate 295 may also occur via one or more additional piezoelectric elements that may be mounted, for example, between the piezoelectric element 150 and the base 110. However, in some embodiments, as with the biasing force discussed above, no adjustment may be employed or needed.

The spacer 220 may be a substantially hemispherical-shaped VITON element. However, the spacer 220 may have other materials and shapes within the scope of the present disclosure. The spacer 220 may decrease wear and vibration against the piezoelectric element 150 against which the spacer 220 is biased by the biasing element 215.

The apparatus 200 may also be equipped with a system of sensors 296, 297 that may be employed to detect the position of the driven element 190. The sensors 196, 297 may also be part of a feedback mechanism (not shown) or another system or subsystem. The sensors 296, 297 may be electric sensors, which may be capacitive or inductive. The sensors 296, 297 may also be thermal, optical, magnetic, and/or other types of sensors. Sensor 296 is shown as a single sensing element but may comprise multiple elements or a sensory array. Similarly, sensor 297 is shown as containing multiple sensing elements but may only comprise a single sensing element, or may have a different number of sensing elements than shown. Sensors 296, 297 may be formed integrally with, or imbedded into, the actuating member 190 and the piezoelectric element 150, respectively. The sensors 296, 297 may also be separate components that are attached with an adhesive, for example. The location of the sensors 296, 297 may vary from that shown and there may also be other sensors (not shown) which may provide feedback and/or location information regarding other components of the apparatus 200. In some embodiments, only a single sensor may be provided. In addition to using a feedback or sensor system based on electronics, a mechanical system may be used. For example, a force exerted by the piezoelectric element 150 could be mechanically amplified and used to adjust the load force of the friction element 170 against the wear plate 295.

Figure 3:
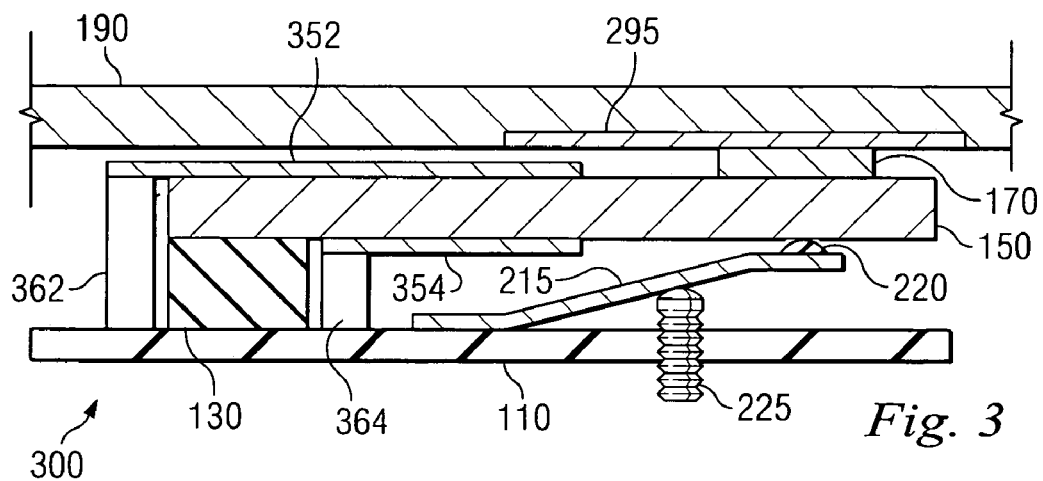
FIG. 3 is a sectional view of at least a portion of one embodiment of an apparatus according to aspects of the present disclosure.

Referring to FIG. 3 with continued reference to FIG. 2, illustrated is a sectional view of another embodiment of the apparatus 200 shown in FIG. 2, herein designated by the reference numeral 300, according to aspects of the present disclosure. In addition to several of the components described above, the apparatus 300 includes restraints 352, 354 coupled to the base 110 by mounts 362, 264, respectively. In one embodiment, however, the restraints may be secured within the apparatus 300 in other manners. For example, the restraint 352 may be coupled to the friction element 170 or the driven element 190, such that the mount 362 may not be necessary.

The restraints 362, 364 may limit bending, rotation or other out-of-plane motion of the piezoelectric element 150 such that motion of the piezoelectric element 150 may be substantially limited to longitudinal extension and contraction. Piezoelectric elements of specific shapes and compositions that are designed for linear motion are known to exhibit bending motions at certain frequencies and under certain loads. The restraints 352, 354 may remain in surface contact with at least a portion of the piezoelectric element 150, thereby preventing such bending. In one embodiment, the restraints 352, 354 may comprise glass, metal, alloys, and/or other materials that may or may not be similar to the materials of a micro-scale embodiment, and may have a thickness ranging between about 0.1 millimeters and about 1 millimeter. In other embodiments, the restraints 352, 354 may comprise silicon, sapphire, ceramic, aluminum ceramic or alloys thereof, and/or other materials, and may have a thickness ranging between about 0.1 microns and about 5 microns. In one embodiment, the restraint 352 has a thickness about equal to the thickness of the friction element 170.

The length of the restraints 352, 354 may range between about 10% and about 95% of the length of the piezoelectric element 150. For example, the length of the restraints 352, 354 may be maximized to substantially span the length of the piezoelectric element 150 when the piezoelectric element 150 is in an unbiased configuration, which may be a non-actuated configuration, possibly permitting sufficient space at the end of the piezoelectric element 150 to affix the friction element 170. In one embodiment, the length of the restraints 352, 354 may range between about 40% and about 60% of the length of the piezoelectric element 150. The lengths of the restraints 352, 354 may also be dissimilar relative to each other, such as with respect to shape, size, composition, electrical connectivity, and/or otherwise.

In embodiments in which the restraints 352, 354 are conductive, the mounts 362, 364 may serve as insulators to prevent shorting between the piezoelectric element 150 and the base 110. In some embodiments, the restraints may be conductive but covered by an insulative layer to prevent shorting between the piezoelectric element 150 and the base 110. The piezoelectric element 150 may also be covered by an elastomeric layer, which may allow movement but prevent shorting between the piezoelectric element 150 and any other component (e.g., the base 110). Additionally, in other embodiments, there may be more or fewer restraints and mounts than shown in FIG. 3.

Figure 4:
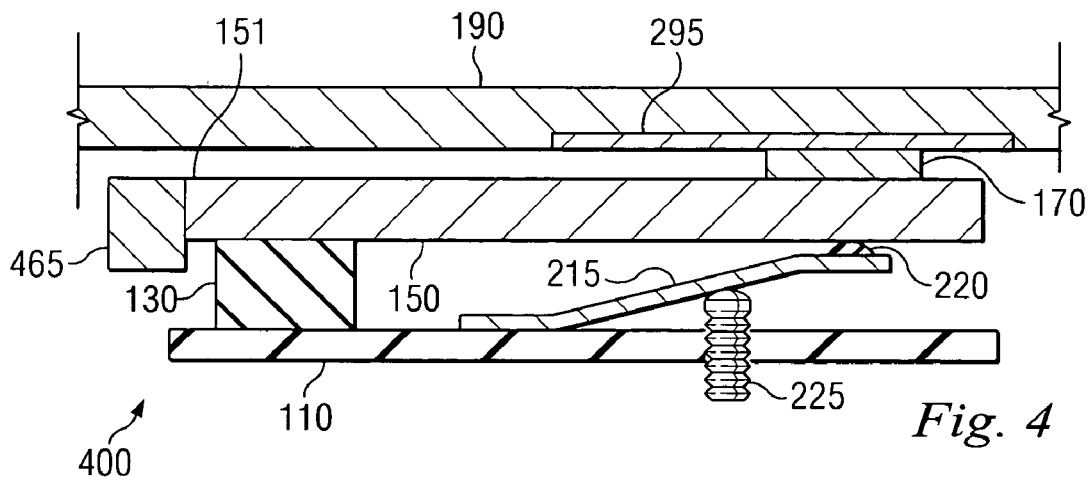
FIG. 4 is a sectional view of at least a portion of one embodiment of an apparatus according to aspects of the present disclosure.

Referring to FIG. 4 with continued reference to FIG. 2, illustrated is a sectional view of another embodiment of the microelectronic apparatus 200 shown in FIG. 2, herein designated by the reference numeral 400. In addition to several of the components described above, the apparatus 400 includes a counterbalance 465. The counterbalance 465 may attach to the end 151 of the piezoelectric element 150. In other embodiments, the placement of the counterbalance 465 may vary, or there may be multiple counterbalances with varying placements on the piezoelectric element 150.

The counter balance 465 may comprise stainless steel, lead, and/or other materials, and the weight of the counterbalance 465 may range between about 50% and about 150% of the weight of the piezoelectric element 150. The counterbalance 465 may be manufactured by casting, machining, electro-chemical machining (ECM), electrical discharge machining (EDM), milling, and/or other methods. The counterbalance may be integral to the piezoelectric element 150 or may be attached by an adhesive, fastener, and/or other means. One or more lateral dimensions of the counterbalance 465 may range from about 10% to about 20% of the length of the piezoelectric element 150. The examples given with regard to the counterbalance 465 and aspects thereof are exemplary—other embodiments may have different properties.

Figure 5:
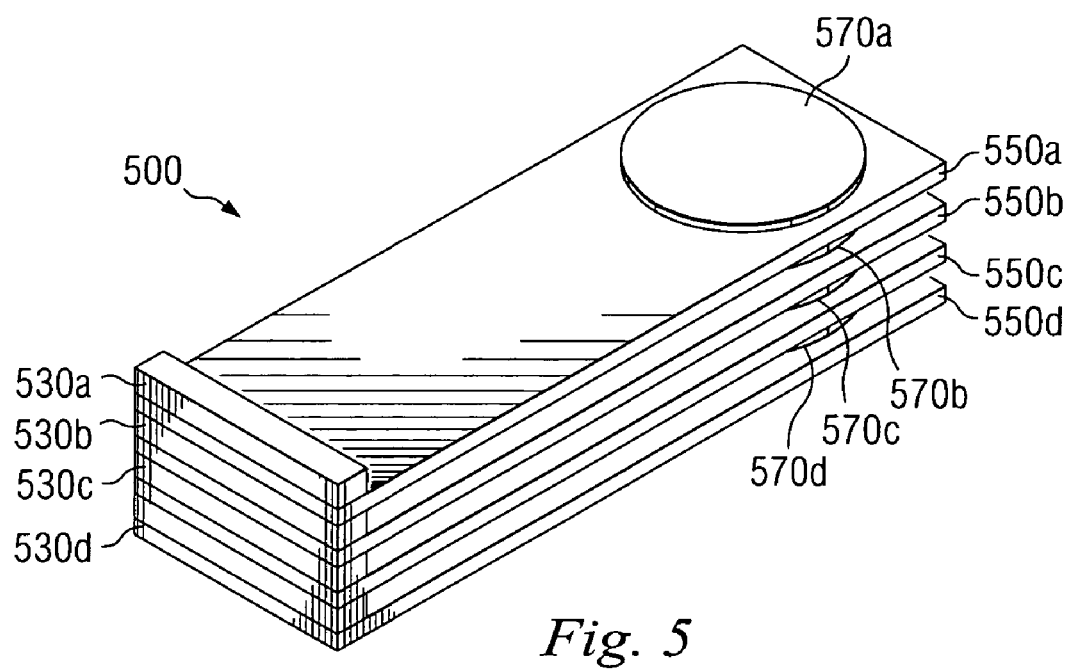
FIG. 5 is a perspective view of at least a portion of one embodiment of an apparatus according to aspects of the present disclosure.

Referring to FIG. 5, a perspective view of one embodiment of a piezoelectric element 500 according to aspects of the present disclosure is illustrated. The piezoelectric element 500 embodies some of the aspects of the embodiments of the piezoelectric element 150 shown in FIGS. 1–4. The piezoelectric element 500 comprises multiple piezoelectric members 550a–d. The piezoelectric members 550a–d may be substantially reed-shaped, as described above with reference to FIG. 1a, although other configurations are within the scope of the present disclosure. The piezoelectric members 550a–d may be substantially similar to one another such that a substantially similar electrical signal applied to each of the piezoelectric members 550a–d will create a substantially similar elongation or contraction motion in each of the members. The piezoelectric members 550a–d may be bound at a common end by insulators 530a–d, which may also serve to connect them to a base or substrate (not shown). In other embodiments, the piezoelectric members may be clamped, glued, or laminated together, or may be integral to one another. The piezoelectric elements 550a–d may impart motion in unison to a driven element via friction elements 570a–d, wherein the friction elements 570a–d may each be substantially similar in composition and manufacture to the friction element 170 shown in FIG. 1a.

Figure 6:
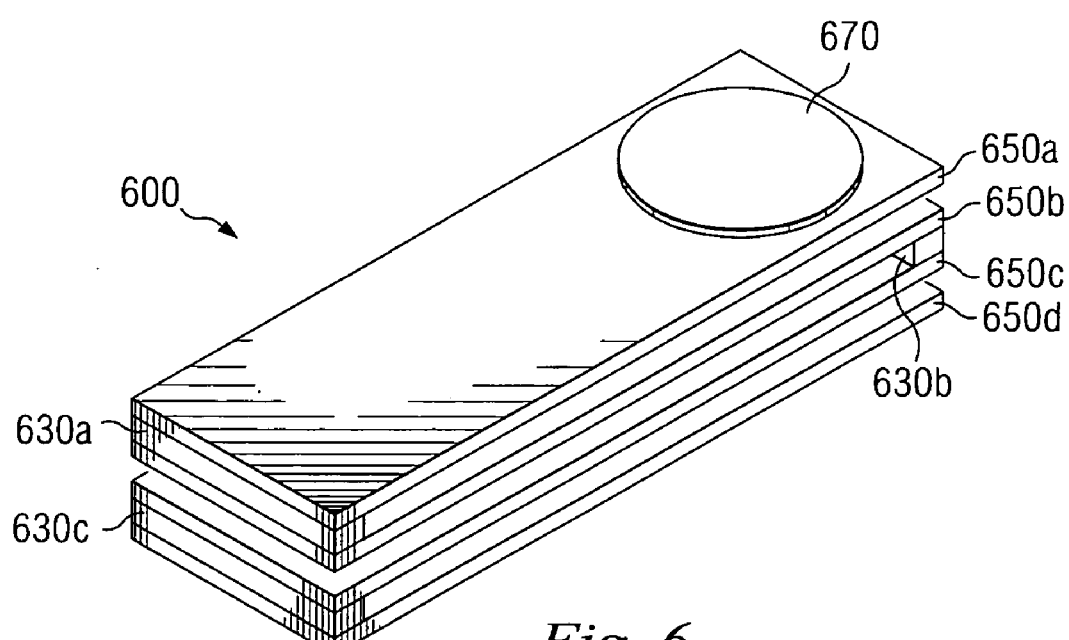
FIG. 6 is a perspective view of at least a portion of one embodiment of an apparatus according to aspects of the present disclosure.

Referring to FIG. 6, illustrated is a perspective view of another embodiment of the piezoelectric element 500 shown in FIG. 5, herein designated by reference numeral 600. The piezoelectric element 600 comprises multiple piezoelectric members 650a–d, which may each be substantially similar to the members 550a–d shown in FIG. 5, although other configurations are within the scope of the present disclosure. Spacers 630a–c may interpose and connect the piezoelectric members 650a–d. Ones of the spacers 630a–c located on opposing sides of one of the piezoelectric members 650a–d may be located proximate opposing ends of the piezoelectric member. For example, in the illustrated embodiment, the spacer 630*a* is proximate an opposing end and opposing side (surface) of the piezoelectric member 650*b* relative to the spacer 630*b*.

Each piezoelectric member 650*a–d* may be biased opposite the member next to it. For example, piezoelectric members 650*a* and 650*c* may contract in response to an electrical signal that may cause piezoelectric members 650*b* and 650*d* to elongate. A friction element 670 may be positioned near an actuating end of an outermost one or more of the piezoelectric members 650*a–d*, and may be employed to engage a driven element, such as those shown in FIGS. 1*a*–4.

Figure 7:
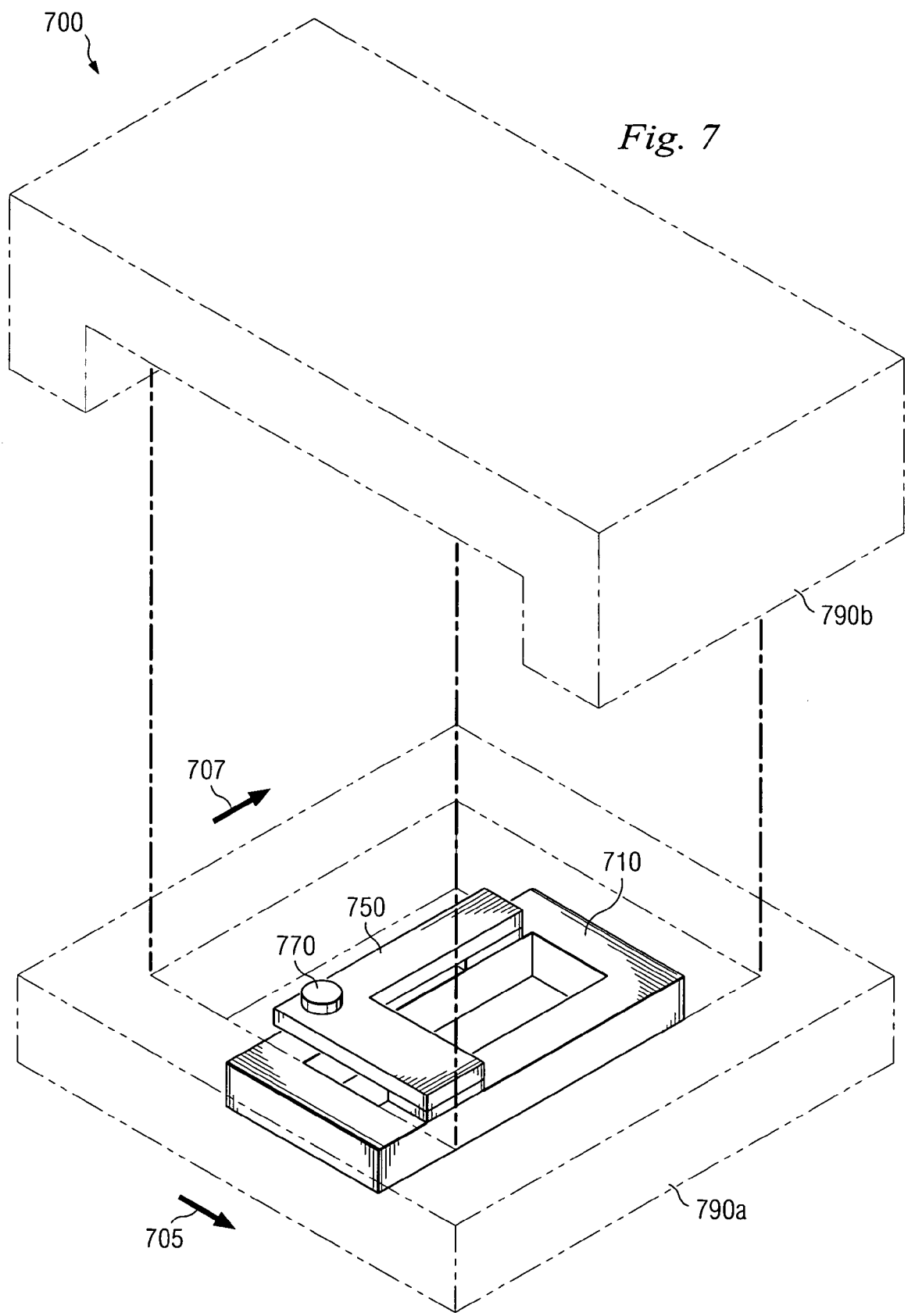
FIG. 7 is a perspective view of at least a portion of one embodiment of an apparatus according to aspects of the present disclosure.

Referring to FIG. 7, illustrated is a perspective view of an embodiment of an apparatus 700 according to aspects of the present disclosure. The apparatus 700 achieves two independent planes or directions of movement, and includes a base 710 attached to a piezoelectric element 750.

The base 710 may be substantially similar in composition and manufacture to the base 110 shown in FIG. 1*a*. In one embodiment, the length and width of the base 110 may both range from about 5 millimeters to about 20 millimeters. In other embodiments, the base 110 may have a length and width both ranging between about 50 microns and about 200 microns.

The piezoelectric element 750 is generally shaped as an angled member, possibly including two or more segments coupled or integrally formed together. The angle of the piezoelectric element 750 may range between about 45 degrees and about 135 degrees. The piezoelectric element 750 may comprise similar materials as the piezoelectric elements described above, and may be manufactured according to similar principles. In one embodiment, the piezoelectric element 750 may range from about 0.5 centimeters to about 15 centimeters in length and width. In other embodiments, the piezoelectric element 750 may range between about 50 microns and about 200 microns in length and width.

The apparatus 700 may also include a friction element 770 attached near a vertex or junction of two or more segments of the piezoelectric element 750. The friction element 770 may be substantially similar in composition and manufacture to the friction element 170 shown in FIG. 1*a*.

The apparatus 700 also includes two driven elements 790*a*, 790*b*. The driven element 790*a* is configured to slide relative to the base 710 in a first direction 705, and the driven element 790*b* is configured to slide relative to the driven element 790*a* (and, hence, the base 710) in a second direction 707. In one embodiment, the first and second directions 705, 707 are substantially orthogonal, although other relative orientations of the first and second directions 705, 707 are within the scope of the present disclosure.

The piezoelectric element 750 may attach to the base 710 at two ends each distal from the attachment point of the friction element 770. In this manner, an electrical signal may be applied to the piezoelectric element 750 to produce actuation of the piezoelectric element 750 along at least two planes or directions of movement. The two directions of movement may correspond to movement of the two separate pieces of the driven element 790*a*, 790*b*, which are configured to manipulate the surface of the driven element 790*b* in two dimensions, as described above. The driven element components 790*a–b* may each be substantially similar in composition and manufacture as the driven element 190 shown in FIG. 1*a*. Coarse positioning may be achieved, for example, by application of a fluctuating electrical signal to produce slip-stick movement of one or both of the driven elements 790*a*, 790*b*. Fine positioning may be achieved, for example, by application of a non-fluctuating electrical signal to the piezoelectric element 750.

Figure 8:
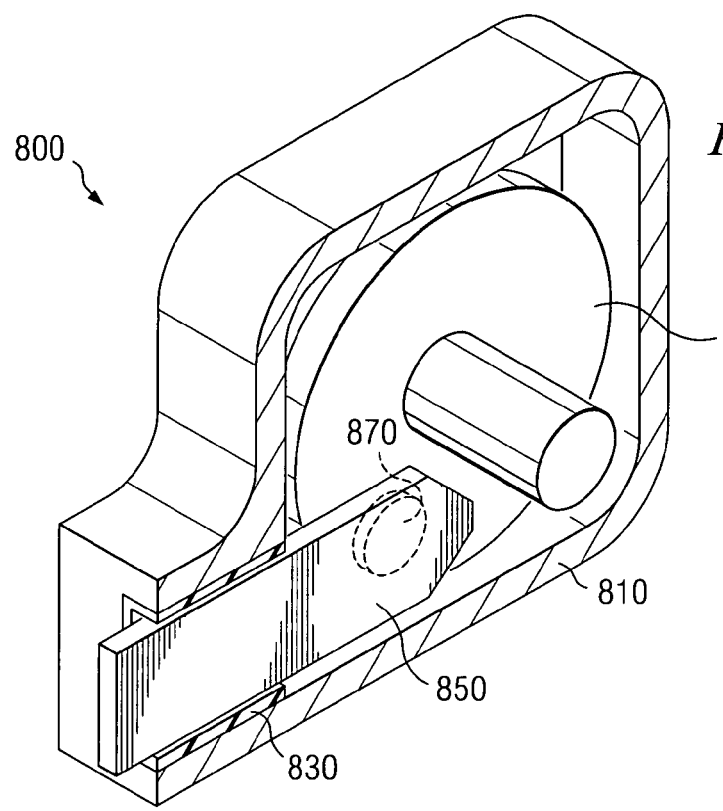
FIG. 8 is a cutaway perspective view of at least a portion of one embodiment of an apparatus according to aspects of the present disclosure.

Referring to FIG. 8, a cutaway view of an embodiment of an apparatus 800 according to aspects of the present disclosure is illustrated. The apparatus 800 may be configured to produce rotary motion in a driven element 890. The apparatus 800 includes a base 810 and an insulator 830, wherein the insulator 830 attaches a piezoelectric element 850 to the base 810. The composition and manufacture of the base 810, insulator 830, and piezoelectric element 850 may be similar to those in embodiments previously described. The piezoelectric element 850 may have an attached friction element 870, which slidably frictionally engages the driven element 890. The driven element 890 may be substantially similar in composition and manufacture to the driven element 190 shown in FIG. 1*a*, and may be substantially disc-shaped, possibly having a diameter ranging between about 0.5 cm and about 15 cm. In other embodiments, the driven element 890 may have a diameter ranging from about 50 microns to about 200 microns.

The driven element 890 may be rotatably attached to the base 810. Rotation of the driven element 890 may be achieved by applying a first fluctuating electrical signal to the piezoelectric element 850. A fluctuating electrical signal may generate a slip-stick movement of the driven element 890. Slip-stick movement may be employed to achieve coarse positioning, while fine positioning may be achieved by application of a non-fluctuating electrical signal. Rotation of the driven element 890 in an opposite direction may be achieved by application of a fluctuating electrical signal of a different form than the first.

Figure 9:
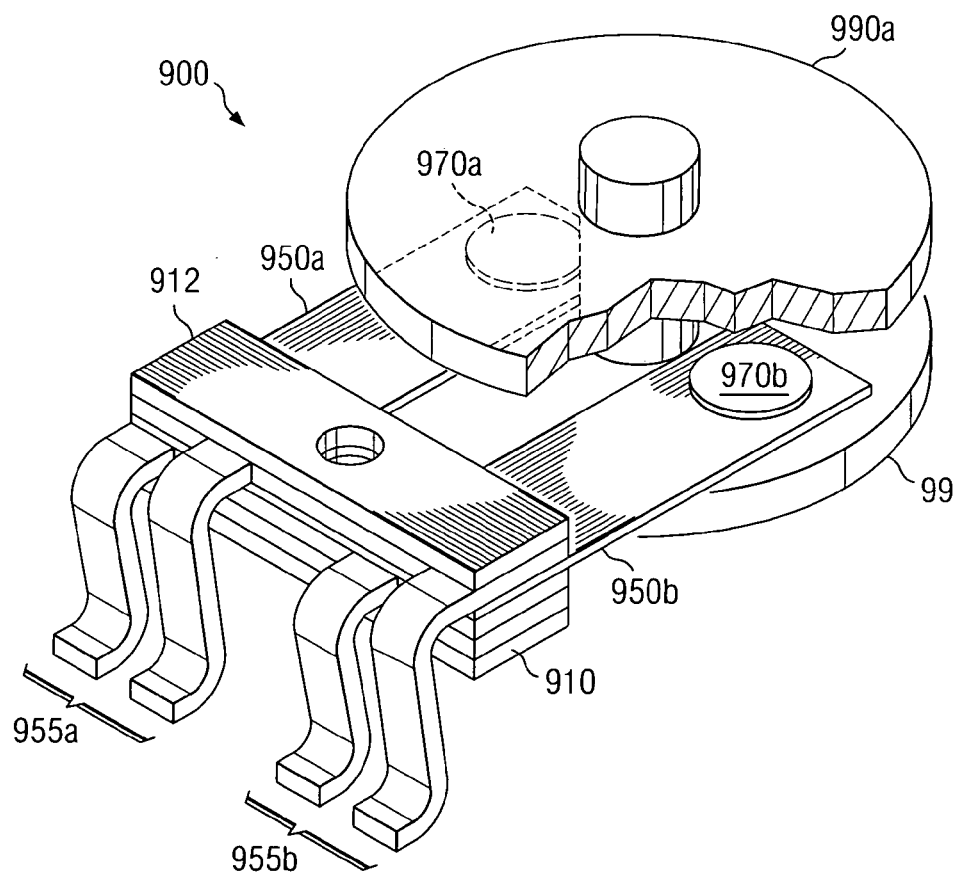
FIG. 9 is a perspective view of at least a portion of one embodiment of an apparatus according to aspects of the present disclosure.

Referring to FIG. 9, a perspective view of an embodiment of an apparatus 900 according to aspects of the present disclosure is illustrated. The apparatus 900 may produce rotational movement in driven elements 990*a–b* and is similar to previously described apparatus 800. The apparatus 900 comprises a base 910 and a bracket 912 for attachment of piezoelectric elements 950*a*, 950*b*. The bracket 912 may comprise aluminum oxide, ceramic, beryllium, brass, gold, and/or other materials. Electrodes 955*a*, 955*b* are employed in the illustrated embodiment to apply electrical signals to piezoelectric elements 950*a* and 950*b*, respectively. In this configuration, the piezoelectric elements 950*a*, 950*b* may have attached friction elements 970*a*, 970*b*, respectively. The friction elements 970*a*, 970*b* may independently engage driven element 990*a*, driven element 990*b*, or both (e.g., friction elements 970*a* and/or 970*b* may be positioned on each of opposing surfaces of elements 950*a* and/or 950*b*). In the embodiment of FIG. 9, the apparatus 900 includes two piezoelectric elements 950*a*, 950*b* and two driven elements 990*a*, 990*b*, but the apparatus 900 may include any number of driven elements engaged by any number of piezoelectric elements within the scope of the present disclosure.

The driven elements 990*a*, 990*b* may be rotationally and coaxially attached along a central axis. The driven elements 990*a*, 990*b* may be configured to rotate only as a fixed unit, or may be configured to rotate independently. Coarse rotational motion of the driven elements 990*a*, 990*b* may be controlled by slip-stick motion resulting from fluctuating electrical signals, which may be applied to the piezoelectric elements 950*a*, 950*b*, via electrodes 955*a*, 955*b*. The signal may be applied such that one piezoelectric element (for example, element 950*a*) is in a "slip" phase, while the other piezoelectric element (for example, element 950*b*) is in a "stick" phase. Non-fluctuating electrical signals may also be applied to either, or both, of the piezoelectric elements 950a, 950b to control fine positioning.

Figure 10:
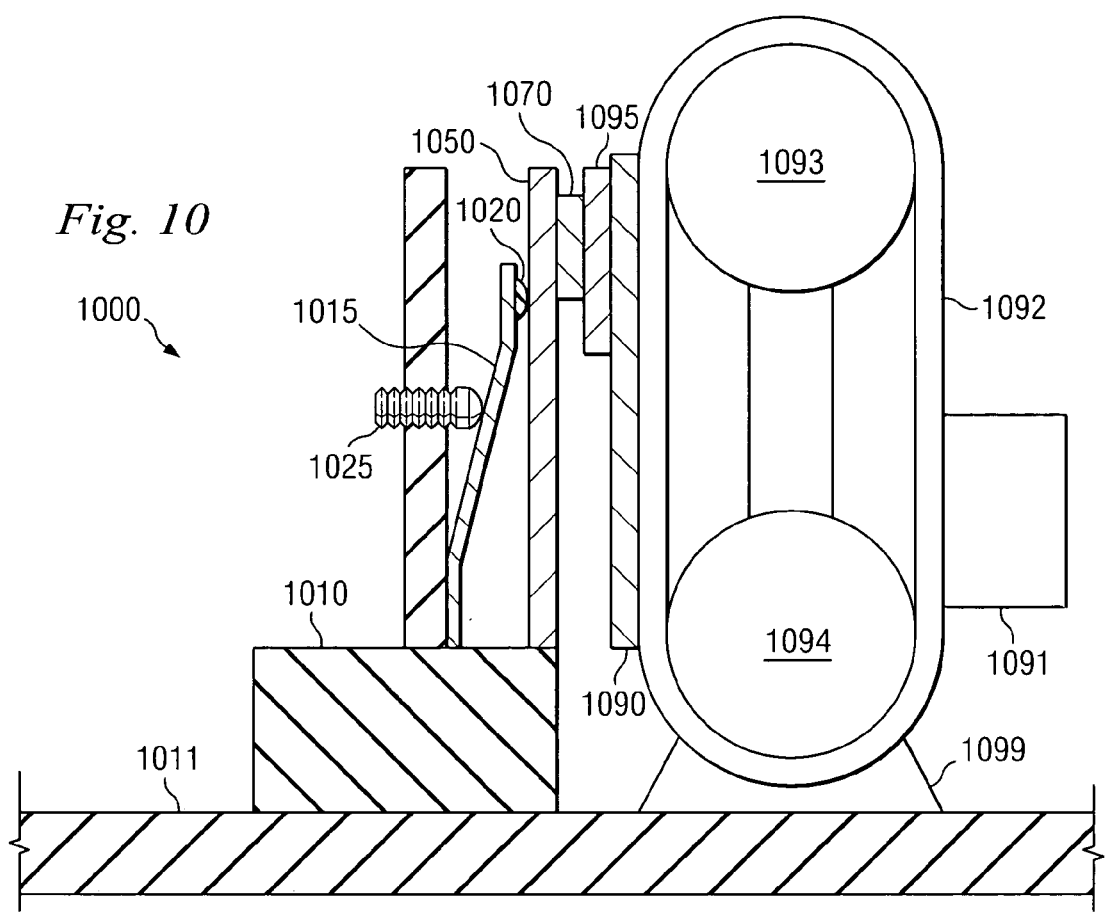
FIG. 10 is a side view of at least a portion of one embodiment of an apparatus according to aspects of the present disclosure.

Referring to FIG. 10, a side view of another embodiment of a microelectronic apparatus 1000 according to aspects of the present disclosure is illustrated. The apparatus 1000 may produce substantially orthogonal motion of driven elements 1090, 1091 each relative to a substrate 1011. The apparatus 1000 comprises a base 1010 mounted on or over the substrate 1011. The materials and method of manufacture for the base 1010 and substrate 1011 may be substantially similar to those described regarding the bases of previously described embodiments. The base 1010 and substrate 1011 may be separate components attached by adhesive and/or other means, or they may be integral to one another.

A biasing element 1015, which may correspond in materials and manufacture to biasing elements heretofore described, possibly with an attached spacer 1020, also corresponding in materials and manufacture to spacers heretofore described, is mounted to the base 1010. The tension of the biasing element 1015 may be adjustable, such as via a threaded fastener 1025 and/or other means. The biasing element 1015 biases the piezoelectric element 1050 and/or an attached friction element 1070 against a wear plate 1095, which is attached to driven element 1090. The friction element 1070 and wear plate 1095 may be substantially similar in composition and manufacture to friction elements and wear plates previously described, respectively. In some embodiments, the wear plate 1095 may be optional.

A piezoelectric element 1050 operates to move the driven element 1090 for coarse positioning via slip-stick motion resulting from the application of a fluctuating electrical signal. To achieve fine positioning, a non-fluctuating electrical signal may be applied to the piezoelectric element 1050. The piezoelectric element 1050 may be similar in composition and manufacture and piezoelectric elements heretofore described. In the illustrated embodiment, the driven element 1090 is attached to the driven element 1091 via a looped band 1092. The driven elements 1090, 1091 may be substantially similar in composition and manufacture to driven elements previously described. However, the second driven element 1091 may be similar to, or different from, the first driven element 1090.

The band 1092 connecting the driven elements 1090, 1091 may be silicon, rubber, stainless steel, and/or other materials. The length of the band 1092 may range between about 1.5 centimeters and about 45 centimeters, and the band 1092 may have a thickness ranging between about 100 microns and about 250 microns. The band 1092 may be supported by rollers or tensioners 1093, 1094, which may be substantially cylindrical. The tensioners 1093, 1094 may comprise silicon, metal, and/or other materials. The dimensions of the tensioners may be set according to the dimension of the band 1092 and piezoelectric element 1050. The tensioners 1093, 1094 may be rotatably attached to the substrate 1011 by support structure 1099, which may include bearings, posts, etc. The band 1092 may translate movement of the first driven element 1090 to the second driven element 1091. The dimensions given above reference a macro-scale embodiment, but it may be possible to scale the apparatus 1000 to smaller sizes, possibly including a micro-scale embodiment.

Figure 11:
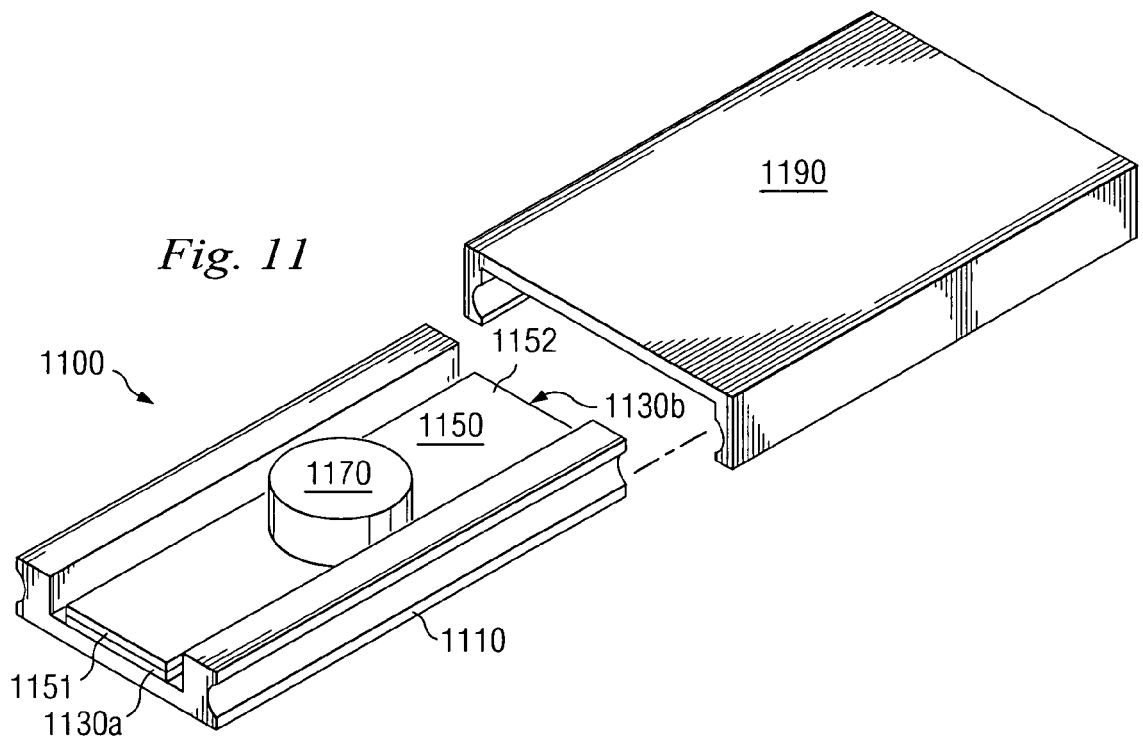
FIG. 11 is a perspective view of at least a portion of one embodiment of an apparatus according to aspects of the present disclosure.

Referring to FIG. 11, a perspective view of an embodiment of an apparatus 1100 according to aspects of the present disclosure is illustrated. The apparatus 1100 may be substantially similar in materials, construction, and dimension as apparatus 100 (FIG. 1a). For example, base 1110 and driven element 1190 may be similar in materials, construction, and dimension to base 110 and driven element 190 of apparatus 100, respectively. The apparatus 1100 features a piezoelectric element 1150 that may be anchored at both ends to the base 1110. The element 1150 may also be sectioned or partitioned, including two or more portions 1151, 1152, which may be electrically isolated from one another. Insulators 1130a, 1130b may serve to anchor the piezoelectric element 1150 to the base 1110. The insulators 1130a, 1130b may be substantially similar to insulator 130 of apparatus 100. The piezoelectric element 1150 may be substantially reed-shaped and may otherwise be similar to piezoelectric element 150 of apparatus 100. A friction element 1170 may be attached at a substantially central point on the piezoelectric element 1150. The friction element 1170 may be substantially similar to friction element 170 of apparatus 100. In operation, the apparatus 1100 may operate by application of actuating signals of differing polarities to different sections 1151, 1152 of the piezoelectric element 1150. In such case, a slip-stick movement of the friction element against the slide table 1190 may result from a contraction in one section (e.g., section 1151) of the piezoelectric element 1150 with a corresponding elongation in another section (e.g., section 1152).

Figure 12:
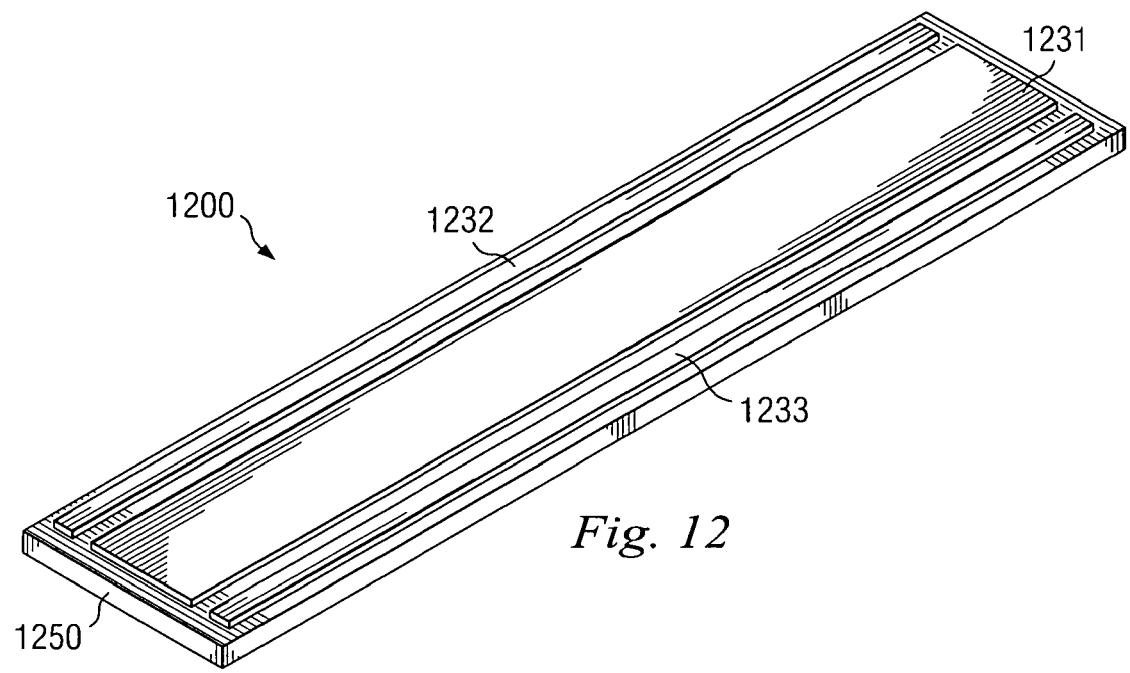
FIG. 12 is a perspective view of at least a portion of one embodiment of an apparatus according to aspects of the present disclosure.

Referring to FIG. 12, a perspective view of an embodiment of an electrode configuration 1200 for a piezoelectric element 1250 according to aspects of the present disclosure is illustrated. Piezoelectric element 1250 may be substantially similar to piezoelectric elements previously discussed, such as piezoelectric element 150 (FIG. 1a). A main electrode 1231 may be placed on substantially the full length of piezoelectric element 1250. In some embodiments, the main electrode 1231 may be a plurality of electrodes. The placement of the main electrode 1231 may also vary from that shown. The main electrode 1231 may comprise copper, gold, and/or other materials which may be deposited onto piezoelectric element 1250 or formed integrally therewith. Correction electrodes 1232, 1233 may be placed on substantially the full length of the piezoelectric element 1250, possibly on either side of the main electrode 1231. The correction electrodes 1232, 1233 may vary in number and placement from that shown. The correction electrodes 1232, 1233 may comprise copper, gold, and/or other materials, which may be deposited onto piezoelectric element 1250, or formed integrally therewith.

A friction element (not shown) such as friction element 170 (FIG. 1a) may be attached to the piezoelectric element 1250 to transfer movement to a driven element (not shown). In operation, the main electrode 1231 may be used to provide an actuating signal to the piezoelectric element 1250. The actuating signal may be as previously described with respect to previous embodiments (e.g., a waveform or a non-fluctuating voltage). The correction electrodes 1232, 1233 may be used instead of, or in addition to, the main electrode 1231 to provide corrections in the deflection or movement of the piezoelectric element 1250. Similar to the main electrode 1231, the correction electrodes 1231, 1232 may be provided with waveform voltage or a non-fluctuating voltage, which may be smaller, larger, or the same as the voltage provided to the main electrode 1231.

Figure 13:
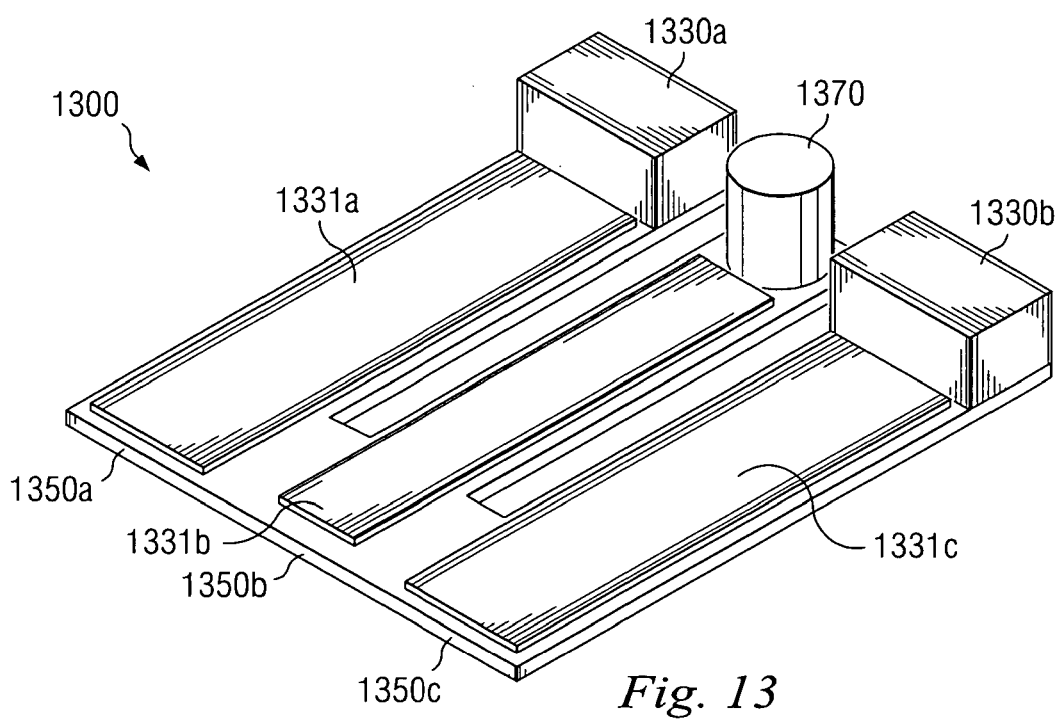
FIG. 13 is a perspective view of at least a portion of one embodiment of an apparatus according to aspects of the present disclosure.

Referring to FIG. 13, a perspective view of another embodiment of a piezoelectric element 1300 according to aspects of the present disclosure is illustrated. The piezoelectric element 1300 may be utilized in one or more of the apparatus previously discussed (e.g., apparatus 100) or some other device. The apparatus 1300 may be mounted to a base (e.g. base 110 of FIG. 1a) by mounts 1330a, 1330b, for example. In some embodiments, the placement of the mounts will vary from the placement shown. The piezoelectric element 1300 may be similar in materials and construction as previously described piezoelectric elements. The piezoelectric element 1300 may have one or more piezoelectric members 1350*a–c*. The members 1350*a–c* may be formed integrally or formed separately and subsequently attached together. Electrodes 1331*a*, 1331*b*, 1331*c* may be attached along substantially the length of the members 1350*a*, 1350*b*, 1350*c*, respectively. The electrodes 1331*a*, 1331*b*, 1331*c* may be substantially similar to electrode 1231 (FIG. 12).

In operation, the electrodes 1331*a–c* may be used to apply an actuating signal to the respective members 1350*a–c*. As previously described the actuating signal may be a waveform or a non-fluctuating voltage. The polarity of the signal applied to members 1350*b* via electrode 1331*b* maybe opposite to the polarity of the signal applied to members 1350*a*, 1350*c* via electrodes 1331*a*, 1331*c*, respectively. Thus, an elongation of member 1350*b* may correspond to a contraction of members 1350*a*, 1350*c*, and vice-versa. A friction element 1370 may be attached to the piezoelectric element 1300 to interface with a driven element (not shown) such as slide bed 190 (FIG. 1*a*). The friction element 1370 may be similar in materials and construction to friction elements previously described (e.g. friction element 170 of FIG. 1*a*). Thermal expansion in the piezoelectric element 1300, which could lead to an unwanted displacement of the friction element 1370, may be alleviated by expansion in an opposite direction of member 1350*b* relative to members 1350*a*, 1350*c*.

Figure 14:
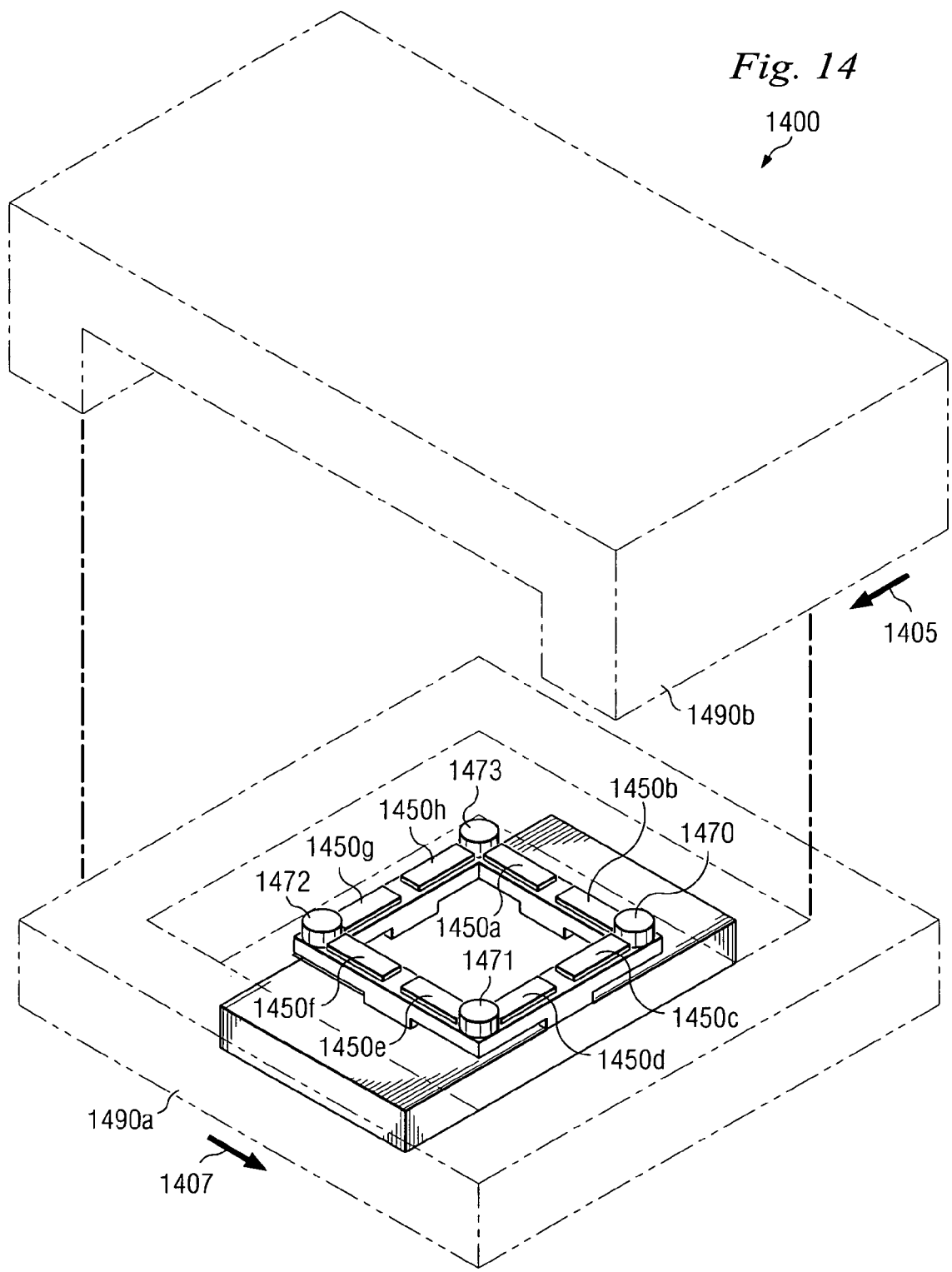
FIG. 14 is a perspective view of at least a portion of one embodiment of an apparatus according to aspects of the present disclosure.

Referring to FIG. 14, a perspective view of another embodiment of an apparatus 1400 of the present disclosure is illustrated. The apparatus 1400 may be similar in materials, construction, and dimension to apparatus 700 (FIG. 7). Like apparatus 700, the apparatus 1400 may achieve two independent planes of movement (e.g., 1405, 1407). The apparatus 1400 may have multiple piezoelectric elements 1450*a–h*. In some embodiments, two or more of the piezo electric elements 1450*a–h* may be combined or manufactured as a single angled piezo electric element such as piezoelectric element 750 (FIG. 7). The apparatus 1400 may have a plurality of friction elements 1470, 1471, 1472, 1473. The friction elements 1470, 1471, 1472, 1473 may be substantially similar to friction element 770 (FIG. 7). The piezoelectric elements 1450*a–h* may elongate or contract as in response to a waveform previously described in order to achieve slip stick motion for coarse positioning. Fine positioning may be achieved by application of a non fluctuating voltage, as previously described, to one or more of the piezoelectric elements 1450*a h*.

The present disclosure provides an apparatus including, in one embodiment, a base configured to slidably engage a driven element. A piezoelectric element interposes the base and the driven element and is attached to the base proximate a first piezoelectric element end. A friction element is attached proximate a second piezoelectric element end and is configured to selectively engage the driven element.

The present disclosure also introduces an apparatus including, in one embodiment, a slide bed having a recess therein, a slide table having a wear plate on an inner surface, and a piezoelectric reed with attached friction element. The reed is mounted in the slide bed recess and frictionally engages the wear plate via the friction element.

Another embodiment of an apparatus constructed according to aspects of the present disclosure includes a base configured to slidably engage a driven element, and first and second piezoelectric elements, each parallel to the base. A friction element is proximate a junction of the first and second piezoelectric elements and extends in first and second directions.

Another embodiment of an apparatus according to aspects of the present disclosure includes a rotatable element rotatably coupled to a substrate. In such an embodiment, a piezoelectric element is coupled to the substrate and a friction element is coupled to the piezoelectric element. The friction element is configured to frictionally engage the rotatable element to impart rotary motion thereto.

An apparatus constructed according to aspects of the present disclosure may also include first and second driven elements and a piezoelectric element, which slidably engages the first driven element. The first and second driven elements may each be coupled to one another via a continuous flexible band supported by at least one roller.

Although embodiments of the present disclosure have been described in detail, those skilled in the art should understand that they can make various changes, substitutions and alterations herein without departing from the spirit and scope of the present disclosure.

What is claimed is:

1. An apparatus, comprising:
 a base configured to slidably engage a driven element;
 a piezoelectric element interposing the base and the driven element and attached to the base proximate a first end of the piezoelectric element; and
 a friction element attached proximate a second end of the piezoelectric element and configured to selectively engage the driven element as a function of velocity of the friction element relative to the driven element.

2. The apparatus of claim 1 further comprising a biasing element configured to bias the piezoelectric element against the driven element.

3. The apparatus of claim 2 further comprising a vibration dampening element interposing the biasing element and the piezoelectric element.

4. The apparatus of claim 3 wherein the dampening element comprises VITON.

5. The apparatus of claim 1 further comprising a wear plate coupled to the driven element and configured to be selectively engaged by the friction element.

6. The apparatus of claim 5 wherein the wear plate comprises a material selected from the group consisting of:
 silicon;
 sapphire; and
 ceramic.

7. The apparatus of claim 1 further comprising a low friction restraint adjacent a portion of at least one of a top or bottom surface of the piezoelectric element.

8. The apparatus of claim 1 wherein the piezoelectric element includes a counterweight proximate the first piezoelectric element end.

9. The apparatus of claim 1 wherein the piezoelectric element comprises a plurality of piezoelectric members.

10. The apparatus of claim 9 wherein each of the plurality of piezoelectric members are substantially reed-shaped.

11. The apparatus of claim 10 wherein each of the plurality of piezoelectric members are laminated to an adjacent one of the plurality of piezoelectric members.

12. The apparatus of claim 1 wherein the piezoelectric element includes first and second piezoelectric members each parallel to the base and angularly offset relative to each other, wherein the friction element is proximate a junction of the first and second piezoelectric members.

13. The apparatus of claim 1 wherein the driven element is rotatably attached to the base such that the piezoelectric element imparts rotational motion to the driven element.

14. The apparatus of claim 13 wherein:
the driven element includes first and second substantially coaxial rotatable members coupled to the base;
the piezoelectric element includes first and second piezoelectric members coupled to the base;
the friction element includes first and second friction members coupled to the first and second piezoelectric elements, respectively; and
the first and second friction members frictionally engage the first and second rotatable elements, respectively.

15. The apparatus of claim 1 wherein:
the base includes a slide bed having a recess therein;
the driven element includes a slide table having a wear plate on an inner surface; and
the piezoelectric element is a piezoelectric reed;
wherein the piezoelectric reed is mounted in the slide bed recess and frictionally engages the wear plate via the friction element.

16. The apparatus of claim 1 wherein the friction element comprises a material selected from the group consisting of:
sapphire;
quartz;
ceramic;
aluminum-bronze;
phosphor-bronze; and
copper-beryllium.

17. The apparatus of claim 1 wherein the driven element is one of first and second driven elements, wherein the piezoelectric element is configured to slidably engage the first driven element, and wherein the first and second driven elements are each coupled to one another via a continuous flexible band supported by at least one roller.

18. The apparatus of claim 1 wherein at least one of the base, the driven element, the piezoelectric element and the friction element substantially has feature dimensions that are greater than about 1000 microns.

19. The apparatus of claim 1 wherein at least one of the base, the driven element, the piezoelectric element and the friction element substantially has feature dimensions that are less than about 1000 microns.

20. An apparatus, comprising:
a base configured to slidably engage a driven element;
a piezoelectric element interposing the base and the driven element and attached to the base proximate a first end of the piezoelectric element; and
a friction element attached proximate a second end of the piezoelectric element and configured to selectively engage the driven element as a function of velocity of the friction element relative to the driven element;
wherein the driven element is attached to a counterweight by a looped flexible band, the band being stabilized by at least one tensioner.

* * * * *

UNITED STATES PATENT AND TRADEMARK OFFICE
CERTIFICATE OF CORRECTION

PATENT NO. : 7,196,454 B2
APPLICATION NO. : 11/061076
DATED : March 27, 2007
INVENTOR(S) : Christof Baur et al.

It is certified that error appears in the above-identified patent and that said Letters Patent is hereby corrected as shown below:

In the Specification at Column 1, line 4, the following language should be inserted:

-- STATEMENT OF GOVERNMENT RIGHTS

The invention was made with Government support under Grant 70NANB1H3021 awarded by the National Institute of Standards and Testing - Advanced Technology Program (NIST-ATP). The Government has certain rights in this invention. --

Signed and Sealed this

Twenty-third Day of March, 2010

David J. Kappos
*Director of the United States Patent and Trademark Office*